United States Patent

[11] 3,627,863

[72] Inventor Theodore H. Fairbanks
  West Chester, Pa.
[21] Appl. No. 825,210
[22] Filed May 16, 1969
[45] Patented Dec. 14, 1971
[73] Assignee FMC Corporation
  Philadelphia, Pa.

[54] METHOD FOR CONTINUOUSLY EXTRUDING NETLIKE STRUCTURES
  7 Claims, 12 Drawing Figs.
[52] U.S. Cl. .................................................. 264/103,
  87/12, 156/148, 264/167, 264/DIG. 81
[51] Int. Cl. ...................................................... D04b 25/00,
  D01d 5/18
[50] Field of Search ............................................ 264/103,
  DIG. 81

[56] References Cited
UNITED STATES PATENTS
3,331,903  7/1967  Mine ............................ 264/103

Primary Examiner—Donald J. Arnold
Assistant Examiner—Arthur H. Koeckert
Attorneys—Thomas R. O'Malley, George F. Mueller and Eugene G. Horsky ABSTRACT: Method of making a netlike structure of woven or braided construction wherein a series of streams, extruded along each of the opposite sides of a common plane, are transferred to and from respective opposite sides of the common plane alternately with relative movement of the two series of streams in directions substantially parallel to the common plane.

METHOD FOR CONTINUOUSLY EXTRUDING NETLIKE STRUCTURES

The present invention is directed to a method of making netlike structures, and particularly woven or braided structures, by extrusion.

U.S. Pat. No. 3,331,903 discloses a method and apparatus for making a net from plastic material by extruding a plurality of pairs of filaments of plastic material in such a manner that the filaments in each pair are spaced from each other in a first direction and the pairs of filaments are spaced from each other a given distance in a second direction. The filaments of each pair of filaments are revolved at the moment of their extrusion and before being solidified about an axis extending between the filaments of each pair of filaments so as to twist the filaments of each pair together and to thus integrally connect the filaments. One of the filaments of each pair of filaments is then moved in a second direction a distance equal to the spacing between pairs of filaments while continuing the extrusion of the filaments, after which pairs of filaments are again revolved as heretofore described. By continuously repeating the above steps and setting of the extruded filaments of plastic material, a netlike structure is provided.

Of particular importance in the method described in the above-noted United States patent is that the extruded filaments are revolved through one or more revolutions while they are still in a plastic condition so as to twist and integrally connect or bond such filaments to each other at their location of twisting.

A primary object of this invention is to provide a new or improved method for making netlike structures having strands or filaments which are interlaced with each other.

Another object of this invention is a new or improved method for making continuous woven or braided netlike structures by extrusion.

Still another object is the provision of a method for making, by extrusion, woven or braided netlike structures having a variety of interlaced strand or filament patterns.

A further object is the provision of a continuous extrusion method for making woven or braided netlike structures using apparatus which is somewhat similar to that of known construction.

These and other objects are accomplished in accordance with the present invention by a method which includes extruding a plurality of pairs of continuous streams of flowable strand-forming material, with the streams in each such pair being spaced from each other in a first direction and the pairs of streams being spaced from each other a given distance in a second direction. The streams of each pair of streams are revolved through an angle of only 180° about an axis extending between the respective streams of each such pair of streams. The streams of each such pair of streams are then moved relatively in the second direction to arrange at least certain of the streams of each pair of streams into different pairs. The streams of strand-forming material are set concomitantly with their extrusion. By continuously repeating the above sequence of movements, with the continuous extrusion of the streams of strand-forming material, a netlike structure is produced.

The axis about which the streams of each pair of streams are revolved is preferably located midway between the respective streams of each such pair of streams. Further, it is essential that the direction of revolution of the pairs of streams be reversed after each relative movement thereof and that the direction of relative movement of the streams be reversed after each revolution of the pairs of streams.

Relative movement of the streams of each pair of streams is preferably effected by moving the streams of each pair of streams oppositely of each other in the second direction. During such movement the streams of each pair of streams may be moved a distance equal to one-half of the given distance between the pairs of streams in the second direction or a further multiple thereof. It will be apparent that this relative movement of the streams of each pair of streams may be varied throughout the method, providing it is a multiple of one-half of the given distance between the pairs of streams, to provide netlike structures with different strand patterns along their lengths.

In the resulting netlike structure, the strands will be interlaced with each other to provide a woven or braided construction. Setting of the extruded streams into strands may be effected prior to any contact between the extruded streams whereby the interlaced strands will be unbonded at their locations of crossing. Alternatively, the extruded streams may be set into strands after such streams have made contact with each other so that the interlaced strands in the resulting netlike structure will form integral junctions with each other at their locations of crossing without disturbing the woven appearance of such strands.

As heretofore mentioned, the apparatus employed in the practice of the method the present invention is somewhat similar to that as disclosed in U.S. Pat. No. 3,331,903. More particularly, the apparatus employed in the method of the present invention includes a set of spaced nozzles located along each of the opposite sides of a common plane, with each of the nozzles having a single extrusion orifice. The nozzles are preferably of like size and configuration, with each having an exterior periphery defined by a semicircular and a flat wall. The locations of the extrusion orifices need not be but are preferably spaced like distances from the common plane and the orifices of the nozzles in each series are spaced equal distances from each other when the straight sides thereof are in the common plane.

Means are provided for continuously delivering flowable strand-forming material to the nozzle extrusion orifices and for setting the streams of such material which are extruded therefrom. The apparatus also includes means for relatively moving or shifting the two sets of nozzles alternately in opposite directions parallel to the common plane and means for revolving aligned nozzles of the two sets of nozzles through an angle of only 180°, with the nozzles of each pair of such aligned nozzles being revolved about a common axis. Revolution of the nozzles is timed to occur alternatively with the relative movement of the sets of nozzles and is controlled so that each nozzle is revolved in a direction opposite to that in which it was moved during its immediately prior revolution.

The teachings of the present invention are applicable for use with a variety of materials, which are referred to by the terms "plastic" or "strand-forming materials," including materials which are thermoplastic, such as polyamides or superpolyamides, polyesters, polyvinyl chloride, copolymers thereof, polyolefins, cellulose acetates, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired. It will be apparent that the manner by which the extruded streams are set will depend upon the particular material which is being employed.

For a greater understanding of this invention, reference is made to the following detailed description and drawing in which FIG. 1 is a vertical section taken longitudinally of the apparatus employed in the practice of the method of the present invention;

Figure 1:
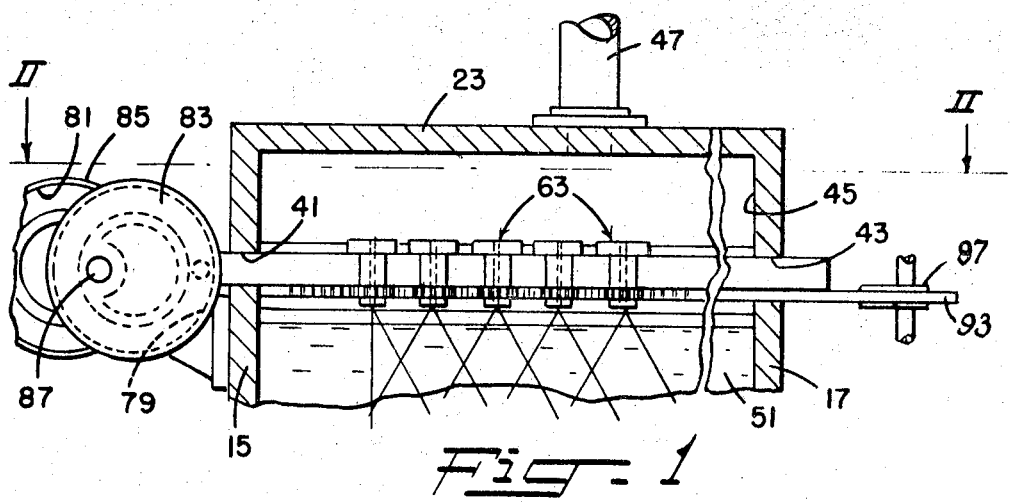

With reference to the drawing, the apparatus includes a pair of vertical support members 15 and 17, side walls 19 and 21, which terminate well above the lowermost ends of the support members 15 and 17, and a top wall 23. Flanges 25 and 27 extend inwardly from the lowermost ends of the side walls 19 and 21 and cooperate with walls 29 and 31, respectively, projecting from the opposing surfaces of such side walls to provide channels 33 and 35. Plates 37 and 39, extending through openings 41 and 43 in the support members 15 and 17, are mounted for sliding movement along the channels 33 and 35 and together with the support members 15 and 17, side walls 19 and 21 and top wall 23, define a closed chamber 45.

A conduit 47 opens into the chamber 45 for delivering flowable strand-forming material thereto under pressure from a suitable source, not shown. Gaskets are provided in the area of the openings 41 and 43 in the support members 15 and 17 to prevent leakage of strand-forming material during sliding movement of the plates 37 and 39. A tank 49 is provided for containing a suitable setting liquid 51 in the area below the plates 37 and 39.

Figure 4:
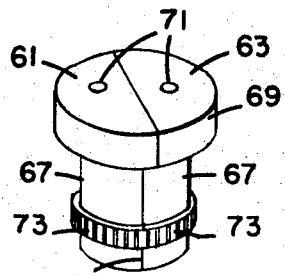
FIG. 4 is a perspective view of one element of the apparatus illustrated in FIGS. 1–3.

In the specific embodiment illustrated, contacting parallel surfaces 53 and 55 of the plates 37 and 39 together define a common plane and are each formed with a series of like, equally spaced, semicircular recesses 57 and 59, respectively. Nozzles 61 and 63, corresponding in shape to the recesses 57 and 59, are positioned within the respective recesses for movement relative thereto, as hereafter described. The nozzles 61 and 63 are of like construction and, as best shown in FIG. 4, each include a flat surface or wall 65, a semicircular wall 67, and a top flange 69 which projects over and rests on the top surface of the respective plates 37 and 39. An extrusion orifice 71 extends longitudinally of each of the nozzles 61 and 63 and a series of gear teeth 73 are formed from along the outer periphery thereof at a location so as to be exposed below the bottom surfaces of the plates 37 and 39.

With the flat surfaces 65 of the nozzles 61 and 63 aligned with each other and with the opposing surfaces 53 and 55 of the plates 37 and 39, at least one of the plates 37 and 39, and the nozzles positioned therein, are moved or shifted longitudinally. Preferably, both of the plates 37 and 39 are shifted longitudinally in opposite directions to each other. This relative longitudinal movement of the plates 37 and 39 is effected through pins 75 and 77 which project from the respective plates 37 and 39 and ride along grooves 79 and 81 formed in the opposing faces of cams 83 and 85. The cams 83 and 85 are of like construction and are fixed, in 180° out-of-phase relationship, to a shaft 87 which is supported by bearings, such as shown at 89, and is intermittently driven by suitable means, not shown. As more fully described hereafter, the plates 37 and 39 are moved a distance substantially equal to one-half the center-to-center spacing of the respective recesses 57 and 59 or further multiple of such spacing so as to move the nozzles 61 and 63, which are carried by such plates, into different positions of alignment with each other.

Alternately with the longitudinal sliding movement of the plates 37 and 39, aligned nozzles carried by such plates are together revolved as a unit through an angle or arc of only 180° so as to move at least some of the nozzles 61 and 63 from the respective plates 37 and 39 to the other thereof. Each revolving movement of the nozzles is in a direction opposite to the previous revolving movement thereof and is effected by gear racks 91 and 93 which mesh with the nozzle gear teeth 71 and are intermittently driven, respectively, by segment gears 95 and 97, which are fixed to oscillating shafts 99 and 101. The flanges 25 and 27 are rabbeted at 103 to provide, with the plates 37 and 39, suitable guide channels 105 for the racks 91 and 93. Of particular importance, and for reasons as hereafter described in detail, gear teeth are omitted from along opposing sides of the racks 91 and 93, as indicated at 107 and 109.

For a clear understanding of the method of the present invention reference is made particularly to FIGS. 5–12 of the drawing in which the nozzles 61 and 63 have been identified by capital and lower case letters, respectively, to better illustrate their movements during various stages of the method.

Figure 2:
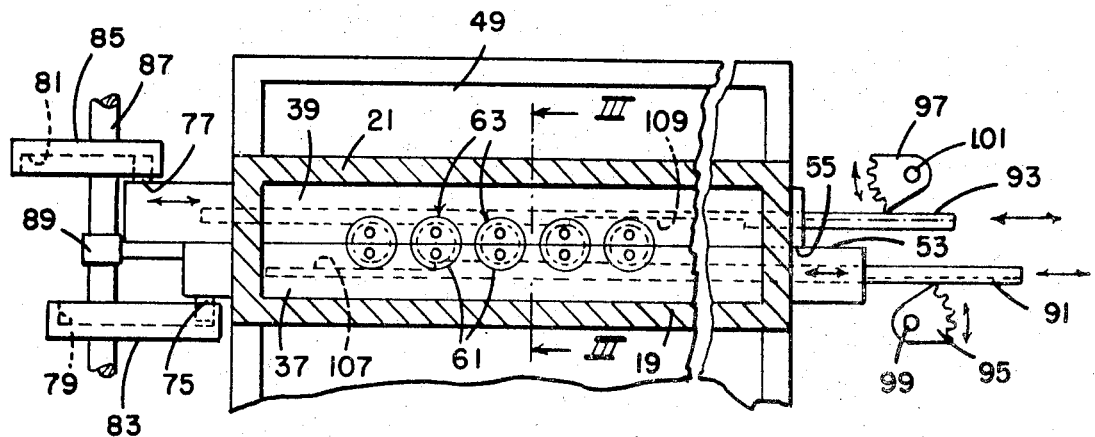
FIG. 2 is a horizontal section taken substantially along the lines II—II of FIG. 1.
Figure 3:
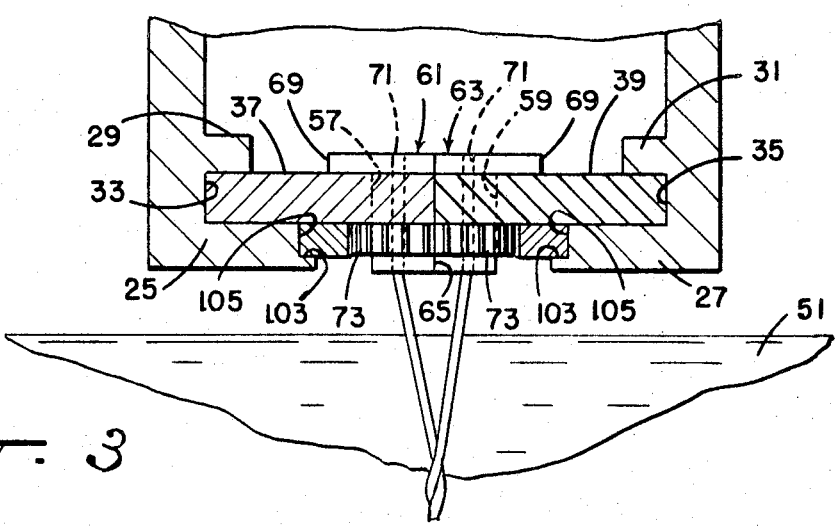
FIG. 3 is a partial vertical section taken transversely through the apparatus substantially along the lines III—III of FIG. 2.
Figure 5:
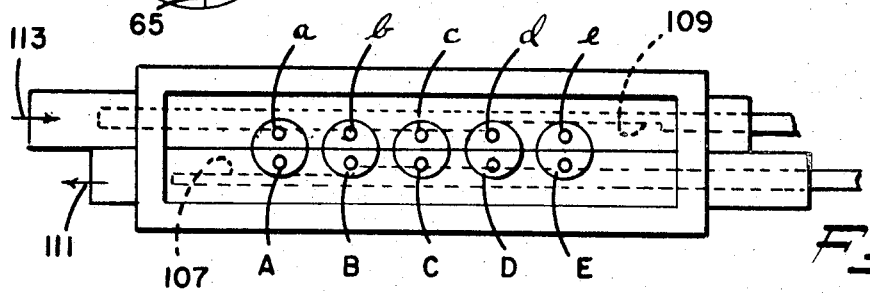
FIGS. 5–12 are diagrammatic illustrations showing the positions of elements of the apparatus at different stages of the method of the present invention.
Figure 6:
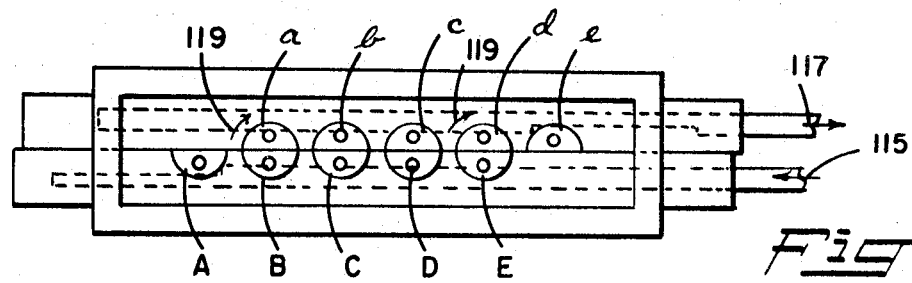

With the various elements of the apparatus in stationary starting positions as shown in FIGS. 2 and 5, a flowable strand-forming material, such as a molten thermoplastic material, is delivered into the chamber 45 and is continuously extruded from the nozzle orifices as streams which are set in the liquid 51, which may cool water. The cams 83 and 85 are now operated to shift the plates 37 and 39 in opposite directions, as indicated by arrows 111 and 113 into positions as shown in FIG. 6 whereby the nozzles B, C, D and E are aligned with nozzles $a$, $b$, $c$ and $d$, respectively. During the above-described movement, the racks 91 and 93 travel with the respective plates 37 and 39.

Figure 7:
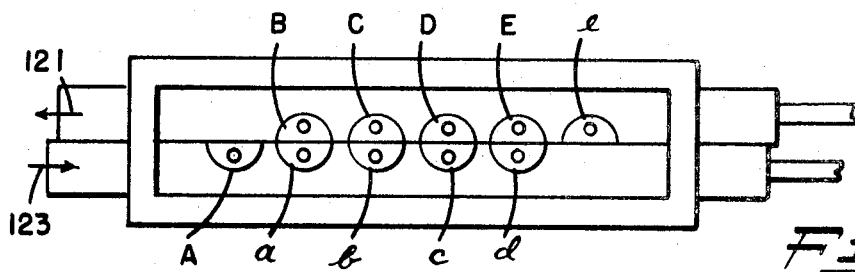

With the plates 37 and 39 now held in stationary positions, the shafts 99 and 101 are oscillated whereby the segment gears 95 and 97 drive the racks 91 and 93 in directions as indicated by arrows 115 and 117. This movement causes aligned pairs of nozzles B–$a$, C–$b$, D–$c$ and E–$d$ to revolve 180° in the direction of arrows 119 and into positions as shown in FIG. 7. Since the rack portions 107 and 109, having no gear teeth, are adjacent to the endmost nozzles, namely nozzles A and $e$, no turning movement is imparted to such nozzles.

Figure 8:
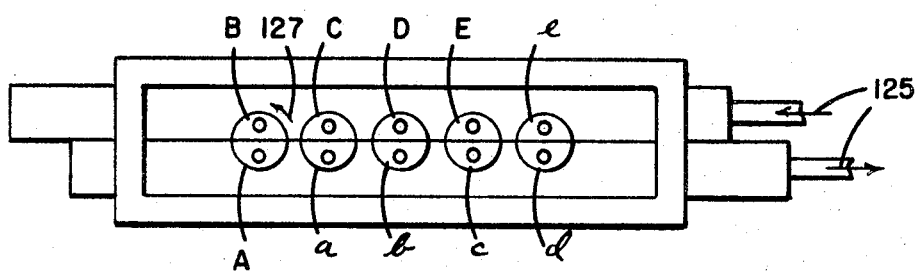

The plates 37 and 39 are now again shifted in directions of arrows 121 and 123; that is, opposite to their direction of movement shown in FIG. 5, with the racks 91 and 93 traveling together with such plate. By this movement, the plates 37 and 39 are returned to their starting positions, but with nozzles A, $a$, $b$, $c$ and $d$ now aligned with nozzles B, C, D, E and $e$, respectively, as shown in FIG. 8.

Figure 9:
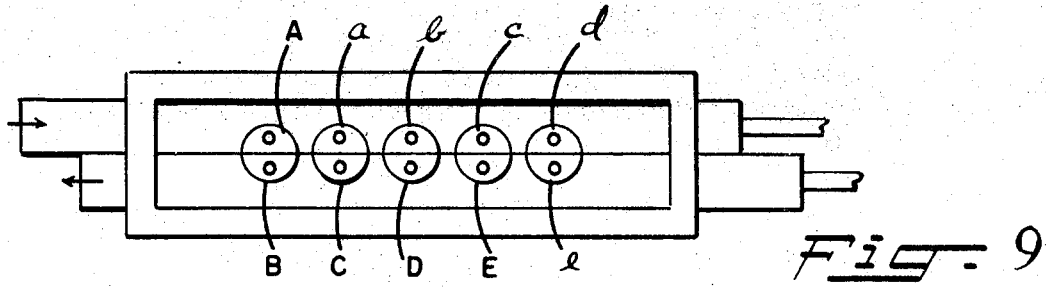

Again the plates 37 and 39 are held stationary, while the racks 91 to 93 are driven in the direction of arrows 125, which is opposite to the direction of their prior movement, as shown in FIG. 6. This shifting of the racks 91 and 93 causes all of the aligned pairs of nozzles to revolve 180° as shown by arrows 127 into positions as shown in FIG. 9.

Figure 10:
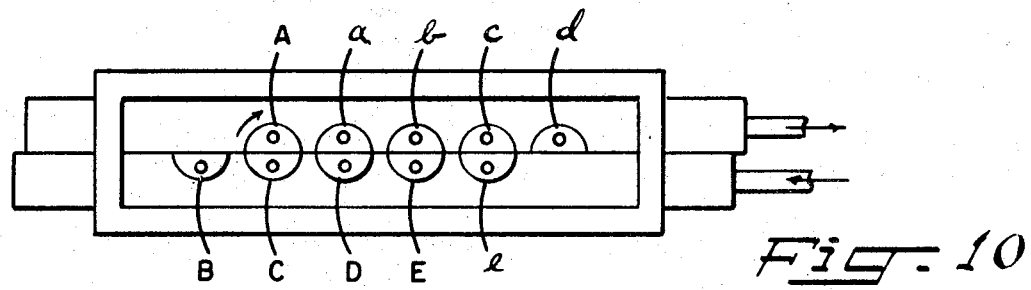
Figure 11:
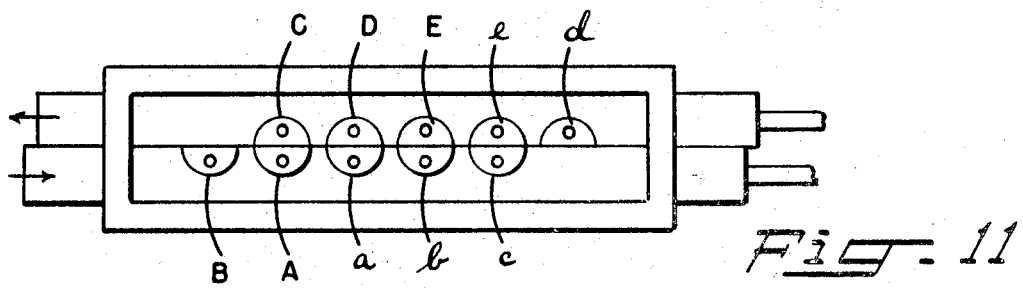
Figure 12:
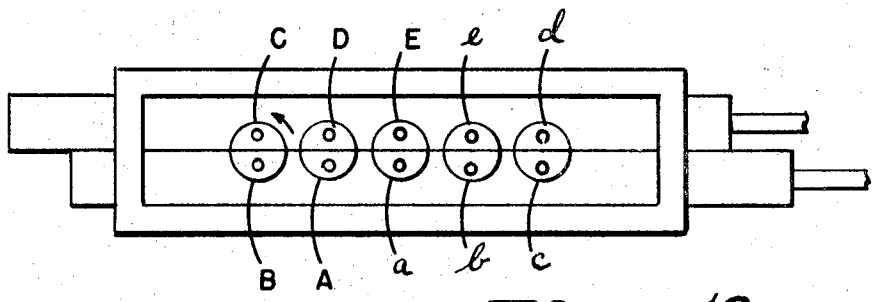

The plates 37 and 39 are now shifted, as heretofore described relative to FIG. 5, into positions as shown in FIG. 10, after which the aligned pairs of nozzles are revolved 180° by the racks 91 and 93, as previously described with reference to FIG. 6. With the nozzles now positioned as shown in FIG. 11, the plates 37 and 39 are urged into their original starting positions, as described with reference to FIG. 7. All nozzles are now again in aligned positions, as shown in FIG. 12, are revolved 180° by the racks 91 and 93 in the same manner as described previously with reference to FIG. 8.

During all of the above-described movements, flowable strand-forming material is continuously extruded as streams from all of the nozzle orifices, which streams may be set into strands prior to or after contact therebetween, by the liquid 51. In tracing the paths of the various nozzles during their described movements, it will be noted that the nozzles, between certain endmost nozzles, are moved parallel to the common plane, as defined by the opposing plate surfaces 53 and 55, alternately with their transfer from one side of such common plane to the opposite side thereof. Further, it will be apparent that each individual nozzle, between endmost nozzles, maintains the same direction of travel relative to the common plane after each transfer thereof from one side of the common plane to the other thereof.

With reference to FIGS. 5–12, following the paths of nozzles $a$, $b$ and $c$ for example, it will be noted that the strands formed by the stream of strand-forming material issuing from the orifices in such nozzles will be moved alternately from one side of the common plane to the opposite side thereof, alternately with their movement to the right. Such strands will cross with strands which are formed by nozzles B, C, D and E and which are moving to the left, as viewed in FIGS. 5–12. Moreover, since the movement of the nozzles $a$, $b$, and $c$ to and from opposite sides of the common plane are 180° out of phase with that of the nozzles B, C, D and E, the strands formed by the nozzles $a$, $b$ and $c$ will be interlaced with the strands formed by the nozzles B, C, D and E to provide a woven netlike structure.

As heretofore mentioned, during stages as shown in FIGS. 6, 8, 10 and 12, aligned pairs of nozzles are revolved through an angle of only 180° so that the strands formed by the nozzles are interlaced or woven rather than being twisted together.

Further, setting of the streams extruded from the nozzle orifices may be effected rapidly to avoid bonding between the crossing strands or may be delayed until the extruded streams have joined to provide integral junctions, yet maintain their interlaced or woven pattern.

I claim:

1. A method of making a netlike structure by extrusion including the steps of extruding a plurality of pairs of continuous streams of flowable strand-forming material, with the streams in each such pair of streams being spaced from each other in a first direction and the pairs of streams being spaced from each other a given distance in a second direction, revolving the streams of each pair of streams through an angle of only 180° about an axis extending between the respective streams of each such pairs of streams, relatively moving the streams of each pair of streams in the second direction to arrange at least certain of the streams of each pair of streams into different pairs, setting the streams into strands concomitantly with their extrusion, and repeating the above sequence of movements simultaneously with the relative movement of the streams of each pairs of streams being reversed after each revolution of the pairs of streams and the direction of revolution of pairs of streams being reversed after each relative movement of the streams of each pair of streams.

2. A method as defined in claim 1 wherein the streams of each pair of streams are extruded along opposite sides of a common plane.

3. A method as defined in claim 1 wherein the extruded streams of strand-forming material are set prior to any contact between such streams.

4. A method as defined in claim 1 wherein the extruded streams are set after streams have contacted each other.

5. A method as defined in claim 1 wherein relative movement of streams of each pair of streams is effected by moving the streams of each such pair opposite of each other in the second direction.

6. A method as defined in claim 5 wherein the streams of each pair of streams are moved in the second direction a distance equal to a multiple of one-half of the given distance.

7. A method as defined in claim 1 wherein the streams of each pair of streams are revolved about an axis located midway between the respective streams of each such pair of streams.

* * * * *